(12) United States Patent
Kim

(10) Patent No.: US 6,668,850 B2
(45) Date of Patent: Dec. 30, 2003

(54) APPARATUS FOR SUPPLYING OXYGEN

(75) Inventor: Tai Jin Kim, Seoul (KR)

(73) Assignee: BioTel Co., Ltd., Hwaseong (KR)

( * ) Notice: Subject to any disclaimer, the term of this patent is extended or adjusted under 35 U.S.C. 154(b) by 79 days.

(21) Appl. No.: 10/100,111

(22) Filed: Mar. 19, 2002

(65) Prior Publication Data

US 2003/0127133 A1 Jul. 10, 2003

(30) Foreign Application Priority Data

| Jan. 8, 2002 | (KR) | .................................... 2002-00487 |
| Feb. 1, 2002 | (KR) | .................................... 2002-05788 |
| Feb. 7, 2002 | (KR) | .................................... 2002-04001 |

(51) Int. Cl.$^7$ ............................................. G05D 11/00
(52) U.S. Cl. ....................................................... 137/93
(58) Field of Search ........................... 137/3, 93, 100, 137/114

(56) References Cited

U.S. PATENT DOCUMENTS

| 3,630,956 A | * | 12/1971 | Benning et al. ............. 252/372 |
| 3,835,012 A | * | 9/1974 | Hemak ........................ 204/428 |
| 5,671,767 A | * | 9/1997 | Kelly ............................. 137/7 |
| 5,887,611 A | * | 3/1999 | Lampotang et al. .......... 137/93 |
| 6,135,967 A | * | 10/2000 | Fiorenza et al. ............ 600/529 |

* cited by examiner

*Primary Examiner*—Stephen M. Hepperle
(74) *Attorney, Agent, or Firm*—Bacon & Thomas, PLLC

(57) ABSTRACT

An apparatus for supplying oxygen includes an oxygen-rich gas supplying unit for discharging an oxygen-rich gas. The oxygen-rich gas supplying unit is provided with a first passage through which the oxygen-rich gas flows, a side surface of the first passage having an opening formed therein, a second passage through which an atmospheric air flows, one end of the second passage is attached to a periphery of the opening formed in the side surface of the first passage in such a manner that the first passage communicates with the second passage, an oxygen sensor for measuring an oxygen concentration of the oxygen-rich gas and installed in the side surface of the first passage, and a valve assembly for closing and opening the second passage and attached to the second passage.

9 Claims, 4 Drawing Sheets

APPARATUS FOR SUPPLYING OXYGEN

FIELD OF THE INVENTION

The present invention relates to an apparatus for supplying oxygen; and, more particularly, to an oxygen-rich gas supplying device having an atmospheric air passage and a valve assembly for closing and opening the atmospheric air passage.

BACKGROUND OF THE INVENTION

There are many apparatuses used to supply oxygen. Such apparatuses typically filter nitrogen from ambient air by using zeolite that serves as an absorbent. Since the zeolite is capable of absorbing the nitrogen, a bed filled with the zeolite can be used to capture the nitrogen in the air introduced therein, thus producing an oxygen-rich gas. The oxygen-rich gas flowing from a discharge point of the bed is collected in a product tank.

Each apparatus for supplying oxygen by utilizing such beds as described above includes an oxygen-rich gas supplying device that discharges through which the oxygen-rich gas is discharged. The oxygen-rich gas supplying device is provided with an oxygen sensor, which gauges oxygen concentration of the oxygen-rich gas supplied therethrough.

The oxygen sensor is calibrated to set a reference value therefor before being used for gauging the oxygen concentration. Further, since a sensing ability of the oxygen sensor is deteriorated while being used, it is required that the oxygen sensor be calibrated periodically during a long-time usage to set a new reference value.

It is one method for calibrating the oxygen sensor to expose the oxygen sensor to an atmospheric air since the oxygen concentration of the atmospheric air is known to be 20.9% and the reference value can be set by using this value.

The conventional apparatuses for supplying oxygen, however, have a drawback. Since the oxygen sensor for gauging the oxygen concentration of the oxygen-rich gas discharged through the oxygen-rich gas supplying device is disposed inside the oxygen-rich gas supplying device, the oxygen-rich gas is stacked around the oxygen sensor even after the supply of the oxygen-rich gas to the oxygen-rich gas supplying device is cut off. As a result, during calibration the oxygen sensor may still be exposed to the oxygen-rich gas and consequently the calibration of the oxygen sensor performed will have a large error.

SUMMARY OF THE INVENTION

It is, therefore, an object of the present invention to provide an apparatus for supplying oxygen having an oxygen-rich gas supplying device capable of supplying atmospheric air toward a detecting portion of an oxygen sensor incorporated in the oxygen-rich gas supplying device so as to calibrate the oxygen sensor more precisely.

In accordance with the present invention, there is provided an apparatus for supplying oxygen, including: an oxygen-rich gas supplying unit for discharging an oxygen-rich gas, including a first passage through which the oxygen-rich gas flows, a side surface of the first passage having an opening formed therein, a second passage through which an atmospheric air flows, one end of the second passage is attached to a periphery of the opening formed in the side surface of the first passage in such a manner that the first passage communicates with the second passage, an oxygen sensor for measuring an oxygen concentration of the oxygen-rich gas flowing through the first passage and installed in the side surface of the first passage in such a manner that a detecting portion of the oxygen sensor is exposed in an inside of the passage, and a valve assembly for closing and opening the second passage and attached to the second passage, wherein the oxygen concentration of the oxygen-rich gas is greater than that of the atmospheric air.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Preferred embodiments of the present invention will now be described with reference to FIGS. 1 to 4. In the following description, like reference notations in FIGS. 1 to 4 represents like parts.

Figure 1:
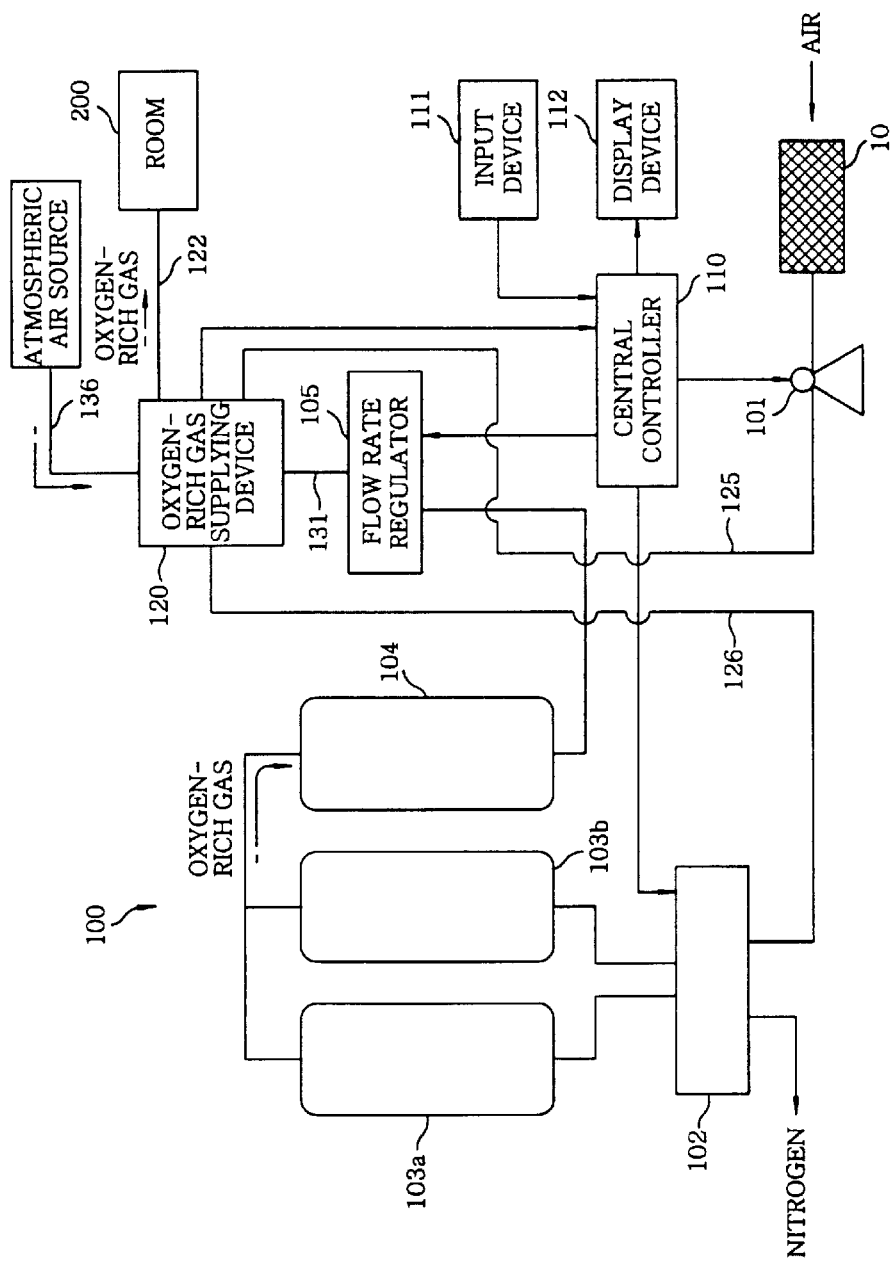
FIG. 1 offers a block diagram of an apparatus for supplying oxygen in accordance with a first embodiment of the present invention.

Referring to FIG. 1, there is shown a block diagram of an apparatus 100 for supplying oxygen in accordance with a first preferred embodiment of the present invention. The apparatus 100 includes an air cleaning filter 10, a compressor 101, a cross-over valving means 102, a pair of beds 103a, 103b filled with zeolite, a product tank 104, a flow rate regulator 105, a central controller 110, an input device ill having a power button (not shown) and a calibration button (not shown), a display device 112 for displaying oxygen concentration supplied therefrom, and an oxygen-rich gas supplying device 120.

The central controller 110 controls the compressor 101, the cross-over valving means 102, the flow rate regulator 105 in response to an input signal from the input device 111.

The compressor 101 draws air from surroundings of the apparatus 100 through the air cleaning filter 10 connected therewith. The air cleaning filter 10 removes dust from the air drawn by the compressor 101. The compressor 101 pressurizes the air in response to a compressor controlling signal from the central controller 110. The pressurized air is supplied to the cross-over valving mean 102 and then either the bed 103a or 103b through a compressor line 125, a pressurized air passage 210 (see FIG. 2) incorporated in the oxygen-rich gas supplying device 120 and a valve line 126, wherein the compressor line delivers the pressurized air from the compressor 101 to the pressurized air passage 210 and the valve line 126 the pressurized air from the pressurized air passage 210 to the cross-over valving means 102.

The cross-over valving means 102 is controlled by the central controller 110 to selectively and cyclically connects one of the beds, e.g., 103a with the discharge line 126. In addition, the other bed, e.g., 103b, which is not connected with the valve line 126, is vented to atmosphere, so that the nitrogen absorbed by the zeolite is discharged to atmosphere through the cross-over valving means 102.

The beds 103a, 103b absorb nitrogen from the pressurized air, thus producing an oxygen-rich gas of a high oxygen concentration. The oxygen-rich gas flowing from the bed 103a or 103b is delivered to the product tank 104 through a shuttle valve (not shown) which prevents a reverse flow of the oxygen-rich gas from the product tank 104 to the beds 103a, 103b. The product tank 104 stores the oxygen-rich gas temporally.

The flow rate regulator 105 connected with the product tank 104 controls an amount of the oxygen-rich gas flowing from the product tank 104 to the oxygen-rich gas supplying device 120 through an oxygen-rich gas supply line 131 in response to a regulating signal of the central controller 110.

The oxygen-rich gas supplying device 120 is supplied with the oxygen-rich gas through the discharges the oxygen-rich gas through a gas outlet line 122 connected to the room 200. The oxygen-rich gas supplying device 120 is provided with an oxygen sensor 121 (see FIG. 2), which gauges the oxygen concentration of the oxygen-rich gas discharged to the room 200 and dispatches a concentration signal indicating the gauged oxygen concentration to the central controller 110.

Figure 2:
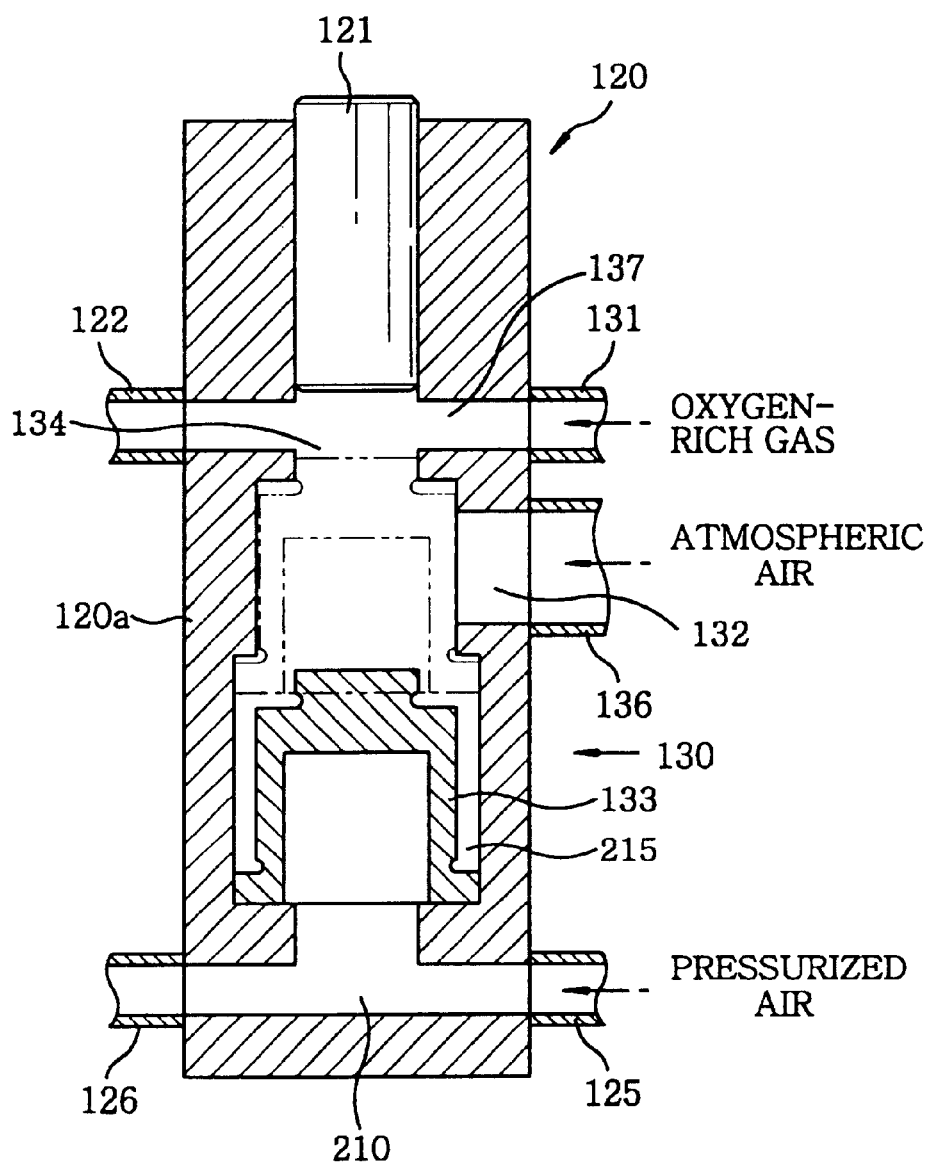
FIG. 2 provides a cross sectional view of an oxygen-rich gas supplying device shown in FIG. 1.

Referring to FIG. 2, there is shown a cross sectional view of the oxygen-rich gas supplying device 120 shown in FIG. 1. The oxygen-rich gas supplying device 120 is provided with the oxygen sensor 121, an oxygen-rich gas passage 137, an atmospheric air passage 132 for supplying atmospheric air toward a detecting portion of the oxygen sensor 121 and a valve assembly 130 for closing the atmospheric air passage 132 while the apparatus 100 is supplying the oxygen-rich gas to the room 200. The oxygen sensor 121 is installed in the side surface of the oxygen-rich gas passage 137 in such a manner that its detecting portion is exposed to an inside of the oxygen-rich gas passage 137. The oxygen-rich gas passage 137 is a passage through which the oxygen-rich gas supplied through an oxygen-rich gas supply line 131 flows to the gas outlet line 122. The oxygen-rich gas passage 137 has an intermediate opening 134 which is formed on the side surface thereof and faces the detecting portion of the oxygen sensor 121.

The atmospheric air passage 132 is formed in a body 120a below the passage 137 and has a first end connected to a periphery of the intermediate opening 134 of the side surface and a second end connected to an atmospheric air supply source through a atmospheric air supply line 136 for supplying atmospheric air. The connection portion of the first end and the atmospheric air passage serves as a valve seat configured to be closely contacted with a valve 133. The atmospheric air supply line 136 is connected to a atmospheric air supplying source, e.g., a multiblade blower (not shown).

Formed in the body 120a is a valve chest 215 in such a manner that its upper end is connected to the atmospheric air passage 132 and its lower end to the pressurized air passage 210. One end of the pressurized air passage 210 is connected to the compressor 101 through the compressor line 125 for supplying the pressurized air and the other end to the cross-over valving means 102 through the valve line 126.

Inserted in the valve chest 215 is a valve 133 which can be moved vertically in the valve chest 215. When being raised to its uppermost position, the valve 133 is closely contacted with the valve seat, so that the valve 33 closes the intermediate opening 134 and prevents the atmospheric air from flowing into the oxygen-rich gas passage 137. In addition, a circumference of a lower portion of the valve 133 contacts closely with an inner surface of the body 120a forming the valve chest 215, so that the pressurized air in the pressurized air passage 210 cannot flow into the atmospheric air passage 132.

When the pressurized air is supplied to the pressurized air passage 210 through the compressor line 125, the valve 133 is raised to its uppermost position as indicated by double-dotted line of FIG. 2 owing to the pushing force of the pressurized air, so that an upper portion of the valve 133 closes the intermediate opening 134. As a result, the atmospheric air passage 132 is closed, so that the supply of the atmospheric air from the atmospheric air source toward the detecting portion of the oxygen sensor 121 is cut off. If the supply of the pressurized air to the pressurized air passage 210 stops, the pressure therein is lowered and the valve 133 is also lowered due to the gravity. As a result, the atmospheric air passage 132 can start to communicate with the oxygen-rich gas passage 137, so that the atmospheric air can be supplied toward the detecting portion of the oxygen sensor 121.

Now, the operation of the valve assembly 130 in accordance with the first preferred embodiment of the present invention will be described with reference to FIGS. 1 and 2.

When the power button of the input device 111 is pushed to activate the apparatus 100 or a calibration button of the input device 111 is pushed in the middle of the operation of the apparatus 100 to perform a calibration of the oxygen sensor 121, a power signal or a calibration signal is generated and dispatched to the central controller 110. When receiving the power signal or the calibration signal, the central controller 110 controls the flow rate regulator 105 to stop supplying the oxygen-rich gas to the oxygen-rich gas supplying device 120 and the compressor 101 to stop supplying the pressurized air to the pressurized air passage 210 for a predetermined time period, e.g., 5 minutes.

In such case as described above, since the pressurized air is not supplied to the pressurized air passage 210, the valve 133 is lowered, so that the atmospheric air passage 132 will start to communicate with the oxygen-rich gas passage 137. Accordingly, the atmospheric air supplied from the atmospheric air supply source flows toward the detecting portion of the oxygen sensor 121 through the atmospheric air passage 132 and the intermediate opening 134. In addition, the flow rate regulator 105 stops the supply of the oxygen-rich gas to the oxygen-rich gas supplying device 120. Consequently, the detecting portion of the oxygen sensor 121 is exposed to the atmospheric air. At this time, the central controller 110 performs one of the steps for calibrating the oxygen sensor 121, i.e., set a reference value by storing an output of the oxygen sensor 121 exposed in the atmospheric air as a value corresponding to the oxygen concentration of the atmospheric air, i.e., 20.9%.

After the predetermined time has elapsed since the push of the power of calibration button and the calibration of the oxygen sensor 121 is completed, the central controller 110 controls the flow rate regulator 105 to supply the oxygen-rich gas to the oxygen-rich gas passage 137 of the oxygen-rich gas supplying device 120, and the compressor 101 to supply the pressurized air to the pressurized air passage 210.

As a result, the valve 133 is moved to its uppermost position to close the valve seat, i.e., the connection of the first end of the atmospheric air passage and the intermediate opening 134 of the oxygen-rich gas passage 137, so that the valve assembly 130 can cut off the supply of the atmospheric air toward the detecting portion of the oxygen sensor 121. In addition, since the oxygen-rich gas is supplied to the oxygen-rich gas passage 137 through the oxygen-rich gas supply line 131, the oxygen-rich gas supplying device 120 provides the room 200 with the oxygen-rich gas. Then, the oxygen sensor 121 measures the oxygen concentration of the oxygen-rich gas discharged to the inside of the room 200 through the oxygen-rich gas supplying device 120 and dispatches the oxygen concentration signal indicating the measured oxygen concentration to the central controller 110. After that, the central controller 110 controls the display device 112 to display the oxygen concentration thereon.

Figure 3:
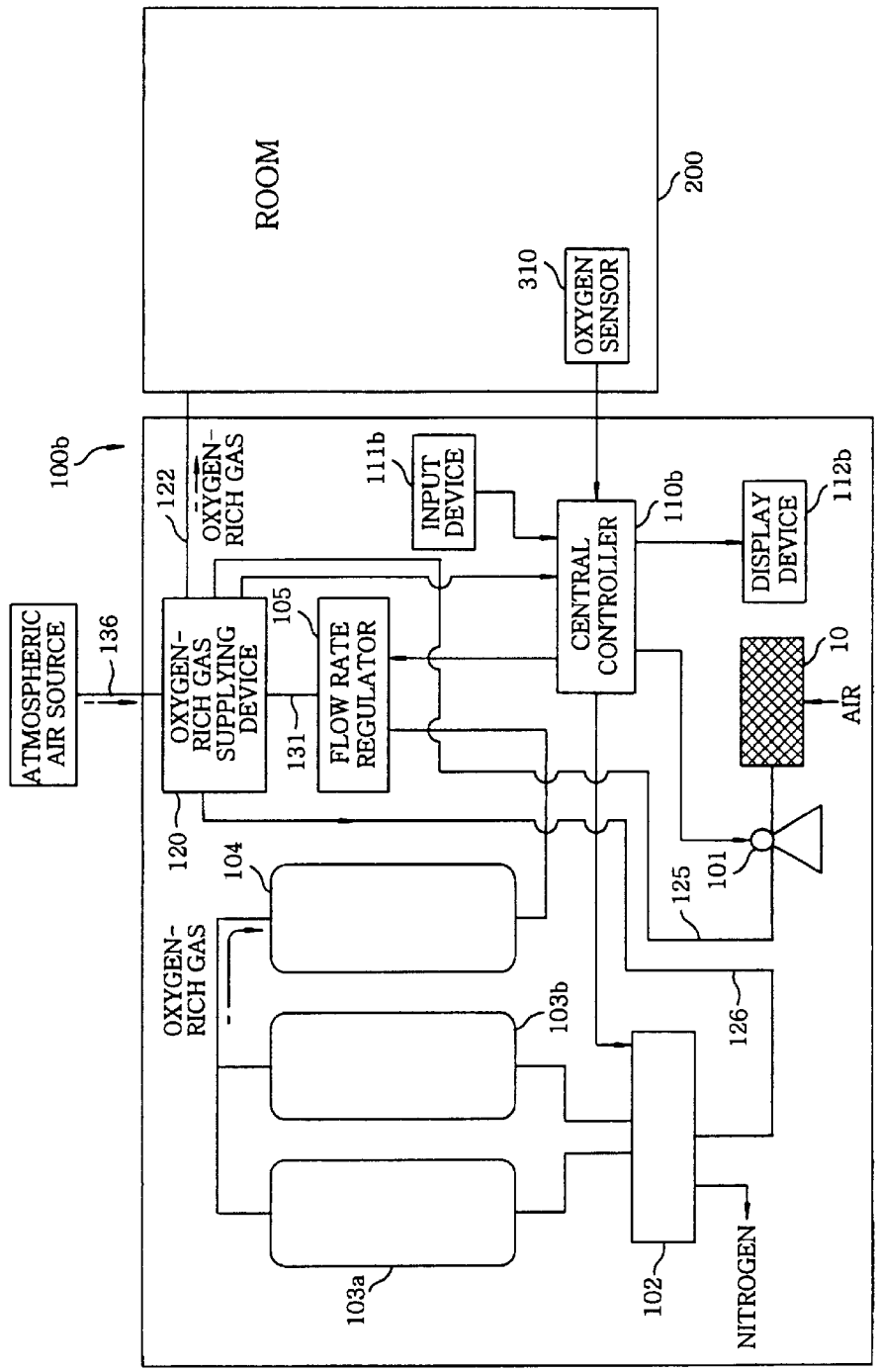
FIG. 3 presents a block diagram of an apparatus for supplying oxygen in accordance with a second embodiment of the present invention.

Referring to FIG. 3, there is shown a block diagram of an apparatus 100b for supplying oxygen in accordance with a second preferred embodiment of the present invention. The apparatus 100b is different from the apparatus 100 in that it includes an oxygen sensor 310 installed in the room 200, a central controller 110b instead of the central controller 110, an input device 111b instead of the input device 111 and a display device 112b instead of the display device 112.

When compared with the apparatus 100 of the first preferred embodiment of the present invention, the input device 111b further has a concentration input button (not shown) for storing a desired value of the oxygen concentration in the central controller 110b. The display device 112b is provided with an LCD Panel for showing the oxygen concentrations of the oxygen-rich gas and inside the room 200.

The oxygen sensor 310 installed in the room 200 measures the oxygen concentration inside the room 200 and dispatches an oxygen concentration signal indicating the measured oxygen concentration of the room 200. After receiving the measured oxygen concentration signal, the central controller 110b compares the measured value with a desired value previously stored therein through the input device 111b. If the measured value is smaller than the desired value, the central controller 110b controls the flow rate regulator 105 to increase the supply of the oxygen-rich gas to the oxygen-rich gas supplying device 120. In addition, the central controller 110b controls the compressor 101 to supply more highly pressurized air to either the bed 103a or 103b, so that the oxygen concentration of the oxygen-rich gas produced by the beds 103a or 103b can be increased. In contrast, if the measured value is greater than the desired value, the central controller lob controls the flow rate regulator 105 to stop the supply of the oxygen-rich to the oxygen-rich gas supplying device 120 and the compressor 101 to stop producing the pressurized air.

Further, it should be noted that a plurality of oxygen sensor could be used for measuring the oxygen concentration inside the room 200. In this case, the central controller 110b takes an average of the measured oxygen concentration signals dispatched from the plurality of oxygen sensors and then compares the average value with the desired value. After that, the central controller 110b controls the flow rate regulator 105 and the compressor 101 in response to a result of the comparison between the average value and the desired value. Furthermore, the central controller 110b controls the display device 111b to display the average value thereon.

Figure 4:
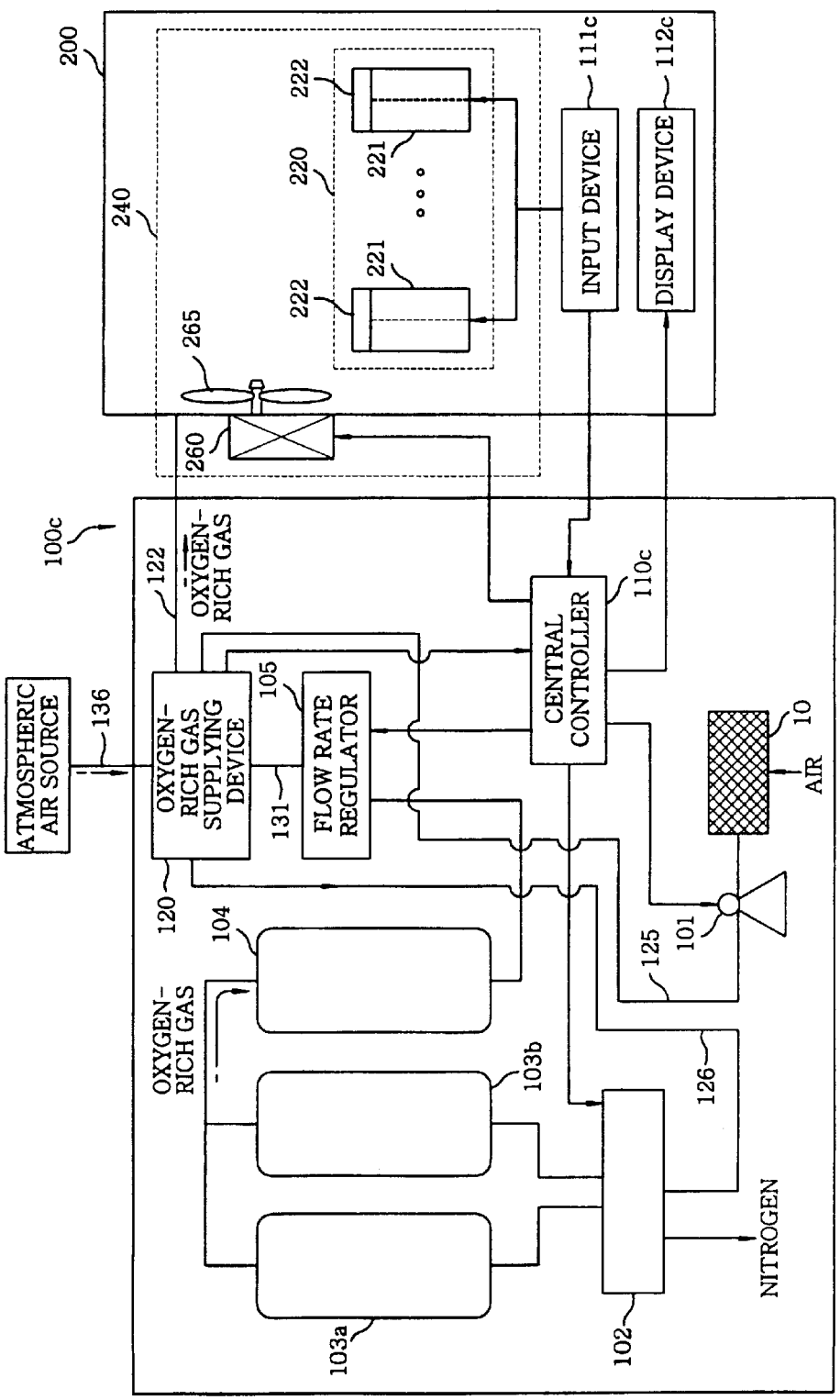
FIG. 4 sets forth a block diagram of an apparatus in accordance with a third preferred embodiment of the present invention.

Referring to FIG. 4, there is shown a block diagram of an apparatus 100c in accordance with a third preferred embodiment of the present invention. The apparatus 100c is different from the apparatus 100 in accordance with the first preferred embodiment in that it includes a device 240 for scenting of environment installed at the room 200, a central controller 110c instead of the central controller 110, an input device 111c instead of the input device 111 and a display device 112c instead of the display device 112.

The device 240 for scenting of environment includes a fragrant substance storing device 220 having a plurality of fragrant substance containers 221. The fragrant substance storing device 220 further includes a rotatable body, e.g., a fan 265, for dispersing the fragrances of the fragrant substances into the oxygen-rich gas flowing from the gas outlet line 122 and an electric motor 260 for rotating the fan 265.

When compared with the apparatus of the first preferred embodiment of the present invention, the input device 111c further has a selection button (not shown) for selecting the fragrance, a concentration button (not shown) for determining the concentration of the selected fragrance and a reservation button (not shown) for setting for starting time and stopping time of the dispersion of the selected fragrance. The display device 112c is provided with an LCD panel (not shown) for showing the oxygen concentration of the oxygen-rich gas, the selected fragrance and the desired concentration of the selected fragrance.

If a user selects the fragrance by operating the selection button, the input device 111c dispatches a selection signal to the fragrance storing device 220. Then the fragrance storing device 220 opens one of the valves 222 in response to the selection signal. In addition, if the user determines a desired concentration of the selected fragrance by operating the concentration button, the input device 111c dispatches a concentration signal to the central controller 110. Then the central controller 110 determines an operating time period and a rotational speed of the electric motor 260 based on the concentration signal.

In case that a couple of a starting and an ending time of the fragrance supply are preset by operating the reservation button, the input device 111c dispatches the reservation signal to the central controller 110 and the central controller 110 controls the device 240 for scenting of environments in such a way that the fragrance is supplied to the room 200 from the preset starting time till the preset ending time. In addition, a plural couples of the starting and the ending times can be selected and a different fragrance can be selected for each couple of the starting and the ending time.

The fragrant substances contained in the fragrant substance containers 221 of the fragrant substance storing device 220 can be in solid or liquid state.

Further, it should be noted that the preferred embodiments described above could be modified without departing from the scope of the present invention.

For instance, both the oxygen sensor 310 (shown in FIG. 3) and/or the device 240 for scenting of environments (shown in FIG. 4) can be applicable to the device 100 (shown in FIG. 1).

Further, it should be noted that a timer could be installed in the preferred embodiments of the present invention, which transmits the calibration signal to the central controller automatically and periodically without a push of the calibration button.

While the invention has been shown and described with respect to the preferred embodiments, it will be understood by those skilled in the art that various changes and modifications may be made without departing from the spirit and scope of the invention as defined in the following claims.

What is claimed:

1. An apparatus for supplying oxygen, comprising:
   an oxygen-rich gas supplying unit for discharging an oxygen-rich gas, including a first passage through which the oxygen-rich gas flows, a side surface of the first passage having an opening formed therein, a second passage through which an atmospheric air flows, one end of the second passage is attached to a periphery of the opening formed in the side surface of the first passage in such a manner that the first passage communicates with the second passage, an oxygen sensor for measuring an oxygen concentration of the oxygen-rich gas flowing through the first passage and installed in the side surface of the first passage in such a manner that a detecting portion of the oxygen sensor is exposed in an inside of the passage, and a valve assembly for closing and opening the second passage and attached to the second passage, wherein the oxygen concentration of the oxygen-rich gas is greater than that of the atmospheric air.

2. The apparatus for supplying oxygen of claim 1, wherein the valve assembly includes a valve chest provided below the second passage, a valve inserted in the valve chest in such a manner that the valve is moved vertically, and a third passage through which a pressurized air flows, wherein a connection portion of the first passage and the one end of the second passage serves as a valve seat, and wherein one end of the valve chest is attached to the second passage in such a manner that the valve chest communicates with the second passage, and the other end of the valve chest is connected to the third passage in such a manner that the valve chest communicates with the pressurized air passage and a pressure in the pressurized air passage is exerted on a bottom surface of the valve.

3. The apparatus for supplying oxygen of claim 2, wherein when the pressurized air flows through the third passage, the valve is moved upward by a pushing force due to the pressure of the pressurized air in the third passage to closely contact with the connection portion of the periphery of the side surface of the first passage and the one end of the second passage serving as the valve seat, so that the valve assembly closes the second passage.

4. The apparatus for supplying oxygen of claim 3, further comprising a compressor for producing the pressurized air, wherein one end of the third passage is connected to the compressor in such a manner that the pressurized air produced by the compressor is supplied to the pressurized air passage.

5. The apparatus for supplying oxygen of claim 4, further comprising:

a flow rate regulator which controls an amount of the oxygen-rich gas supplied to the first passage of the oxygen-rich gas supplying device; and a central controller which controls the flow rate regulator and the compressor, wherein the central controller controls the flow rate regulator to stop supplying the oxygen-rich gas to the first passage of the oxygen-rich gas supplying device and the compressor to stop supplying the pressurized air to the third passage when a calibration of the oxygen sensor is performed in the middle of an operation of the apparatus for supplying oxygen.

6. The apparatus for supplying oxygen of claim 5, further comprising an input device including a calibration button and a display device for displaying the oxygen concentration of the oxygen-rich gas measured by the oxygen-sensor, wherein the input device dispatches an calibration signal to the central controller when the calibration button is pushed, and wherein when receiving the calibration signal from the input device, the central controller controls the compressor to stop supplying the pressurized air to the third passage and the flow rate regulator to stop supplying the oxygen-rich gas to the first passage of the oxygen-rich gas supplying device.

7. The apparatus for supplying oxygen of claim 6, further comprising one or more oxygen sensors installed in a room to which the oxygen-rich gas is discharged from the oxygen-rich gas supplying device, wherein each oxygen sensor installed in the room measures an oxygen concentration inside the room and dispatches a concentration signal indicating the measured oxygen concentration to the central controller.

8. The apparatus for supplying oxygen of claim 7, wherein the central controller receives the concentration signals from the oxygen sensors installed in the room, takes an average of them and compares the average value with a desired value previously stored therein through the input device, wherein the central controller controls the flow rate regulator and the compressor based on a result of the comparison between the average and the stored value.

9. The apparatus for supplying oxygen of claim 6, further comprising a device for scenting of environments installed in a room to which the oxygen-rich gas is discharged from the oxygen-rich gas supplying unit, wherein the device for scenting of environments includes one or more fragrant substance containers for containing a fragrant substance, a rotatable body for dispersing the fragrance of the fragrant substance into the oxygen-rich gas discharged from the oxygen-rich gas supplying device and a driving device for rotating the rotatable body.

* * * * *